US006327073B1

(12) United States Patent
Yahav et al.

(10) Patent No.: US 6,327,073 B1
(45) Date of Patent: Dec. 4, 2001

(54) OPTO-ELECTRONIC SHUTTER

(75) Inventors: Giora Yahav; Gavriel J. Iddan, both of Haifa (IL)

(73) Assignee: 3DV Systems, Ltd., Yokneam (IL)

( * ) Notice: Subject to any disclaimer, the term of this patent is extended or adjusted under 35 U.S.C. 154(b) by 0 days.

(21) Appl. No.: 09/380,788

(22) PCT Filed: Mar. 7, 1997

(86) PCT No.: PCT/IL97/00084

§ 371 Date: Sep. 3, 1999

§ 102(e) Date: Sep. 3, 1999

(87) PCT Pub. No.: WO98/39790

PCT Pub. Date: Sep. 11, 1998

(51) Int. Cl.$^{7}$ .............................. H01J 31/50; H01J 40/14; G02F 1/00; G02F 1/03

(52) U.S. Cl. ................... 359/321; 250/207; 250/214 VT; 313/528; 313/529; 359/241; 359/244

(58) Field of Search ............................ 250/207, 214 VT; 313/528, 529, 542, 543; 359/241, 243, 244, 245, 254, 321

(56) References Cited

U.S. PATENT DOCUMENTS 2,946,895 * 7/1960 Williams ................................ 313/94
3,317,771 * 5/1967 Stoudenheimer et al. ........... 250/213
3,474,275 * 10/1969 Stoudenheimer et al. ........... 250/213
4,220,975 * 9/1980 Lieber et al. ......................... 358/209

FOREIGN PATENT DOCUMENTS

2082830 * 10/1982 (GB) ............................. H01J/31/08
WO 97/01111 1/1997 (WO) ............................. H01J/43/00
WO 97/01112 1/1997 (WO) .
WO 97/01113 1/1997 (WO) ............................ G03B/13/00

* cited by examiner

*Primary Examiner*—Georgia Epps
*Assistant Examiner*—David N. Spector
(74) *Attorney, Agent, or Firm*—Fenster and Company Patent Attorneys, Ltd.

(57) ABSTRACT

An optoelectronic shutter for radiation, comprising an input plate and an output plate, comprising material substantially transparent to the radiation, each plate having an outer and an inner surface, wherein a recess is formed in the inner surface of at least one of the plates, and wherein respective non-recessed portions of the inner surfaces of the plates are bonded together, and the recess defines a vacuum chamber enclosed by the two plates; a photocathode fixed to the inner surface of the input plate, adjacent the chamber, and a photo-emissive anode, fixed to the inner surface of the output plate, adjacent the chamber and opposite the photo-cathode.

48 Claims, 5 Drawing Sheets

OPTO-ELECTRONIC SHUTTER

RELATED APPLICATION

The present application is a U.S. national stage application of PCT/IL97/00084, filed Mar. 7, 1997.

FIELD OF THE INVENTION

The present invention relates generally to optoelectronic devices, and specifically to high-speed shutters for image modulation.

BACKGROUND OF THE INVENTION

Optoelectronic shutters are well known in the art. Such shutters open and shut in response to an electrical waveform or pulse applied thereto, generally without moving mechanical parts. They are used, inter alia, in high-speed image capture applications, for which mechanical shutters are typically too slow. Optoelectronic shutters known in the art include liquid crystal shutters, electrooptical crystal shutters and gated image intensifiers.

Liquid crystal shutters are simple and inexpensive to manufacture. Their speed, however, is inherently limited to about 20 microsecond switching time. Moreover, in their open state, liquid crystal shutters typically transmit only about 40% of the light incident thereon, whereas in their closed state, they still transmit at least 0.1% of the incident light.

Electrooptical crystal shutters can be switched quickly, on the order of 0.1 nanosecond. They require a collimated light input, however, and have only a narrow acceptance angle within which they can shutter incident light efficiently. The crystals themselves are expensive, and costly, high-speed, high-voltage electronics are also needed to switch the shutters on and off at the rated speed. However, shutters using microchannel plates are generally non-linear at high frequencies.

Image intensifiers generally comprise an electron tube and microchannel plate, with a photoelectric photocathode input and a light-emitting phosphor-coated anode at the output. Gated intensifiers further include high-speed switching circuitry, which enables them to be gated on and off quickly, with typical switching times as fast as 1 nanosecond. For light to be effectively shuttered or amplified by the intensifier, it must be focused on the photocathode. Although intensifiers are manufactured in large quantities, the manufacturing process involves attachment of high-voltage feed-through electrode and metal-to-glass sealing, which is complex, labor intensive and therefore costly. Partly as a result of this complexity, gated intensifiers tend to be large and are available in a very limited range of shapes and sizes.

GB 2 082 830 describes an electron beam shutter device that forms an image of a luminous event changing at high speed. FIGS. 1 and 2 of the reference show devices with electrostatic focusing. FIG. 3 shows a device in which the image resolution is low (i.e., the image is defocused and FIGS. 4–8 show a device utilizing a micro-channel plate. With respect to FIG. 3, it is believed that the defocusing is caused by the distance required between the cathode and anode due to the construction of the device.

U.S. Pat. No. 4,220,975 shows a shutter device in which a microchannel plate is used.

SUMMARY OF THE INVENTION

It is an object of the present invention to provide a compact, high-speed optoelectronic shutter, which may be manufactured at relatively low cost in large quantities.

In some aspects of the present invention, the shutter is used in modulating light that is received by an image capture device, such as a high-speed CCD camera.

It is a further object of some aspects of the present invention to provide a method for manufacturing the shutter.

In preferred embodiments of the present invention, an optoelectronic shutter comprises an input plate and an output plate, both made of transparent, preferably non-conducting material. Each of the plates has an inner surface and an outer surface, and a recess is formed on the inner surface of one or both of the plates. The non-recessed portions of the inner surfaces of the two plates are bonded or fused together to form a vacuum seal along a periphery thereof, so that the recess forms a vacuum-tight vacuum chamber therebetween. A photocathode is formed on the inner surface of the input plate, adjacent the chamber, and a photo-luminescent anode is formed on the inner surface of the output plate, opposite the photocathode.

Preferably, a transparent, electrically conductive coating, for example, indium tin oxide (ITO) is applied to at least a portion of the outer surfaces of the plates and to at least a portion of the inner surface of one of the plates, most preferably over the cathode on the input plate. Alternatively, instead of applying the electrically conductive coatings to the outer surfaces, one or both of these coatings may be applied to the inner surfaces of the respective plates, preferably with the addition of an insulating overlay layer.

Preferably, the plates are made of fused quartz or, alternatively, of glass or of silicon or GaAs material. In some preferred embodiments of the invention the output plate may be a fiber optic face plate. The plates are preferably in the range of 0.5 to 5 mm thick. The actual thickness of the plate is chosen to be thick enough so that, when the chamber is evacuated, the substrate does not bow inward from the pressure, to any substantial extent. The active aperture of the shutter, defined by the areas of the photocathode and anode, may be as large as 40 mm across and may be made circular, square or rectangular, depending on the application. Shutters in accordance with the present invention are more compact and may have a substantially greater ratio of active aperture to thickness than high-speed shutters known in the art, such as gated intensifiers and electrooptical crystal shutters, which are generally circular. Furthermore, unlike gated intensifiers, shutters in accordance with the present invention can easily be made in a rectangular shape and size that are similar to the shape and size of an image detector device, such as a CCD detector array.

To operate the shutter, a biasing voltage is applied between the plates, preferably by applying the voltage to the conductive coating on the outer surface of one of the plates. This voltage, preferably in the range of several hundred volts, creates a potential difference across the gap in the chamber between the photocathode and the anode, without breaking down the gap. In this state, the shutter remains substantially non-transmitting to incident light.

To open the shutter, a control voltage, preferably in the range of 10–20 volts, is applied, preferably to increase the potential difference across the gap. In some embodiments of the invention, even lower control voltages may be used. In this state, photons incident on the photocathode cause photoelectrons to be emitted by the photocathode and accelerated across the gap. These electrons strike the anode, which emits light in response to the incident electrons. This process continues until the control voltage is removed, whereupon the shutter closes. Preferably, the shutter takes no more than 2 nanosecond to open or to close.

Alternatively, the shutter may be biased in an open state, in which electrons are normally accelerated across the gap, and the control voltage may be applied to decrease the potential difference and close the shutter.

In preferred embodiments of the present invention, the shutter is produced using micro-electromechanical systems (MEMS) technology, based largely on techniques of photolithography. Such techniques are well known in the art of microelectronics manufacturing. The recess in one or both of the plates is produced by etching the plate, which is initially substantially flat. The photocathode, anode and conductive layers are chemically deposited on the appropriate plate surfaces. The two plates are then sealed together under vacuum, preferably using an indium seal or, alternatively, by brazing them, as is known in the art. Finally, electrical leads are connected to the conductive layers, and the device is potted, preferably in insulating plastic, while leaving the active aperture clear, and packaged for use.

Preferably, the plates are degassed before sealing, as is known in the art. Additionally or alternatively, a getter, such as palladium, may be placed in the chamber before sealing. It will be appreciated that shutters may be mass-produced in accordance with the principles of the present invention at substantially lower cost than high-speed shutters known in the art. Shutters in accordance with preferred embodiments of the present invention generally include only a few components, largely comprising low-cost, readily-available materials. Fabrication of the shutters may be substantially automated. Production of the shutters requires only a single, simple vacuum sealing step, as opposed to image intensifier tubes, for example, which require mechanically complex assemblies and glass-to-metal seals.

In some preferred embodiments of the present invention, a shutter as described above is used to modulate light input to an image capture device, such as CCD camera. An objective lens focuses an image of a scene onto the photocathode of the shutter. When the shutter is opened, the image is conveyed by accelerated electrons from the photocathode to the anode. Light emitted by the anode is focused by an imaging lens or conveyed by a fiber-optic bundle onto a detector array, so that the camera forms an electronic image of the scene, gated by the shutter.

By comparison with gated, intensified cameras known in the art, image capture devices using shutters in accordance with the present invention will be more compact and less costly and will have image quality that is at least as good. As described above, gated intensifiers use microchannel plates and/or externally-focused vacuum electron tubes, both of which can degrade the resolution of images that they transmit, due to electron defocusing. Externally-focused vacuum electron tubes, known in the art, use externally-applied electrical and/or magnetic fields for the purpose of electron focusing; such fields are referred to herein as electromagnetic focusing fields. Shutters in accordance with the present invention cause only minimal defocusing and require no such external focusing fields. Their resolution is generally limited by the "granularity" and blooming of the photo-luminescent anode.

The image capture device may be a conventional, off the shelf CCD camera, modified only by the addition of the shutter, with appropriate fiber optic bundle, objective lens or relay imaging lens. Alternatively, the image capture device may comprise other types of cameras and imagers known in the art, including visible and infrared video and still cameras, as well as film cameras. The shutter will be useful in a wide range of high-speed imaging applications, and particularly in range-gated and three-dimensional distance-responsive imaging, as described in PCT patent applications PCT/IL96/00020, PCT/IL96/00021 and PCT/IL96/00025, all filed Jun. 20, 1996, which are assigned to the assignee of the present patent application and whose disclosures are incorporated herein by reference.

There is therefore provided, in accordance with a preferred embodiment of the present invention, an optoelectronic shutter for radiation, including:

an input plate and an output plate, comprising material substantially transparent to the radiation, each plate having an outer and an inner surface, wherein a recess is formed in the inner surface of at least one of the plate, and wherein respective non-recessed portions of the inner surfaces of the plates are bonded together, and the recess defines a vacuum chamber enclosed by the two plates;

a photocathode, fixed to the inner surface of the input plate, adjacent the chamber; and a photo-luminescent anode, fixed to the inner surface of the output plate, adjacent the chamber and opposite the photocathode.

In a preferred embodiment of the invention, the recess is formed by Micro-Electromechanical System Technology.

In a preferred embodiment of the present invention, substantially similar recesses are formed in the inner surfaces of both the plates.

Preferably, electrons emitted by the photocathode pass through the chamber and strike the anode, responsive to a trigger pulse applied to the shutter, substantially without defocusing. More preferably, there are no external electromagnetic fields applied to the shutter for the purpose of electron focusing, and the shutter does not include a microchannel plate.

There is further provided, in accordance with a preferred embodiment of the present invention, an optoelectronic shutter for radiation, including:

an input plate and an output plate, comprising material substantially transparent to the radiation, each plate having an outer and an inner surface, the plates defining and enclosing a vacuum chamber therebetween;

a photocathode, fixed to the inner surface of the input plate, adjacent the chamber; and a photoluminescent anode, fixed to the inner surface of the output plate, adjacent the chamber and opposite the photocathode, wherein electrons emitted by the photocathode pass through the chamber and strike the anode, substantially without defocusing, responsive to a trigger pulse applied to the shutter, and wherein there are no external electromagnetic fields applied to the shutter for the purpose of electron focusing, and wherein the shutter does not include a microchannel plate.

Preferably, other than fields due to the trigger pulse and to biasing voltage applied between the photocathode and the anode, there are no electromagnetic fields applied to the shutter.

Preferably, the trigger pulse has a peak voltage substantially less than 50 volts, more preferably less than or equal to 20 volts, and most preferably substantially in the range 10–20 volts.

Preferably, at least one of the plates includes quartz or, alternatively, glass or a semiconductor material.

Further preferably, the photocathode includes CdSe or, alternatively, a planar diode, and the anode includes ZnS.

In some preferred embodiments of the present invention, the shutter includes a transparent, conductive coating on the outer surfaces of both plates and on the inner surface of one of the plates.

Preferably, the shutter includes a metal coating on at least a portion of each of the outer surfaces of both plates and over the inner surface of the one of the plates having the transparent, conductive coating, wherein the metal coating is situated along the periphery of and electrically coupled to the transparent, conductive coating thereon.

Further preferably, electrical leads are electrically coupled to the conductive coatings on the outer surfaces of both plates and on the inner surface of the one of the plates.

In other preferred embodiments of the present invention, the shutter includes:

a first transparent, conductive coating on the inner surface of the input plate, between the plate and the photocathode;

a second transparent, conductive coating on the inner surface of the output plate, between the plate and the anode; and a third transparent, conductive coating on the inner surface of one of the input and output plates, intermediate the photocathode and the anode.

Preferably, the shutter includes first, second and third metal coatings on portions of the inner surfaces of the input and output plates, wherein the metal coatings are situated along the periphery of and electrically coupled to the first, second and third transparent conductive coatings, respectively. Preferably, there is an electrically insulating layer intermediate two of the metal coatings. Further preferably, electrical leads are coupled to the transparent, conductive coatings.

Preferably, one of the input and output plates has a notch formed therein, the notch providing access to at least one of the coatings on the inner surface of one of the plates, wherein one of the electrical leads is fastened to the coating exposed within the notch.

Preferably, the anode is electrically negatively biased relative to the photocathode by a biasing voltage substantially less than 1000 VDC. More preferably, the biasing voltage is less than or equal to 500 VDC, and more preferably, the biasing voltage is substantially in the range 300–500 VDC.

Preferably, the overall thickness of the shutter, measured between the outer surfaces of the input and output plates, is substantially less than 20 mm, more preferably less than or equal to 10 mm, and most preferably substantially in the range 1–10 mm.

In some preferred embodiments of the present invention, the shape of the shutter, as defined by the shape of an active aperture thereof, is substantially rectangular.

Preferably, the shutter includes a getter inside the chamber.

In a preferred embodiment of the invention, the output plate comprises a fiber optic face plate.

Preferably, one or both of the input and output plates is non-conducting.

There is also provided, in accordance with a preferred embodiment of the present invention, a method for producing an optoelectronic shutter for radiation, including:

providing first and second plates of material substantially transparent to the radiation, each plate having a first and a second surface;

etching a recess in the first surface of at least one of the plates;

depositing photocathode material on the first surface of the first plate;

depositing photoluminescent anode material on the first surface of the second plate; and bonding the first surface of the first plate to the first surface of the second plate to form an evacuated chamber between the plates, which chamber includes the recess;

wherein depositing the photocathode and anode materials includes depositing the materials over portions of the respective first surfaces of the plates that adjoin the chamber.

Preferably, etching the recess in the first surface of at least one of the plates includes etching recesses in the first surfaces of both of the plates.

Further preferably, depositing photocathode material includes doping an outer layer on the first plate to produce a planar diode.

Preferably, a transparent, conductive coating is deposited on the second surfaces of both plates and on the first surface of one of the plates, and a metal coating is deposited on the surfaces on which the transparent, conductive coating has been deposited, wherein the metal coating is deposited peripherally to and in electrical contact with the transparent, conductive coating. Preferably an electrical contact is affixed to the metal coating.

Preferably, a notch is formed in an edge of one of the first and second plates to provide access to the metal coating, wherein affixing the electrical contact to the metal coating includes fixing the contact within the notch.

The method preferably included potting the shutter.

There is further provided, in accordance with a preferred embodiment of the present invention, a shutter produced according to the method described above.

The present invention will be more fully understood from the following detailed description of the preferred embodiments thereof, taken together with the drawings in which:

DETAILED DESCRIPTION OF PREFERRED EMBODIMENTS

Figure 1:
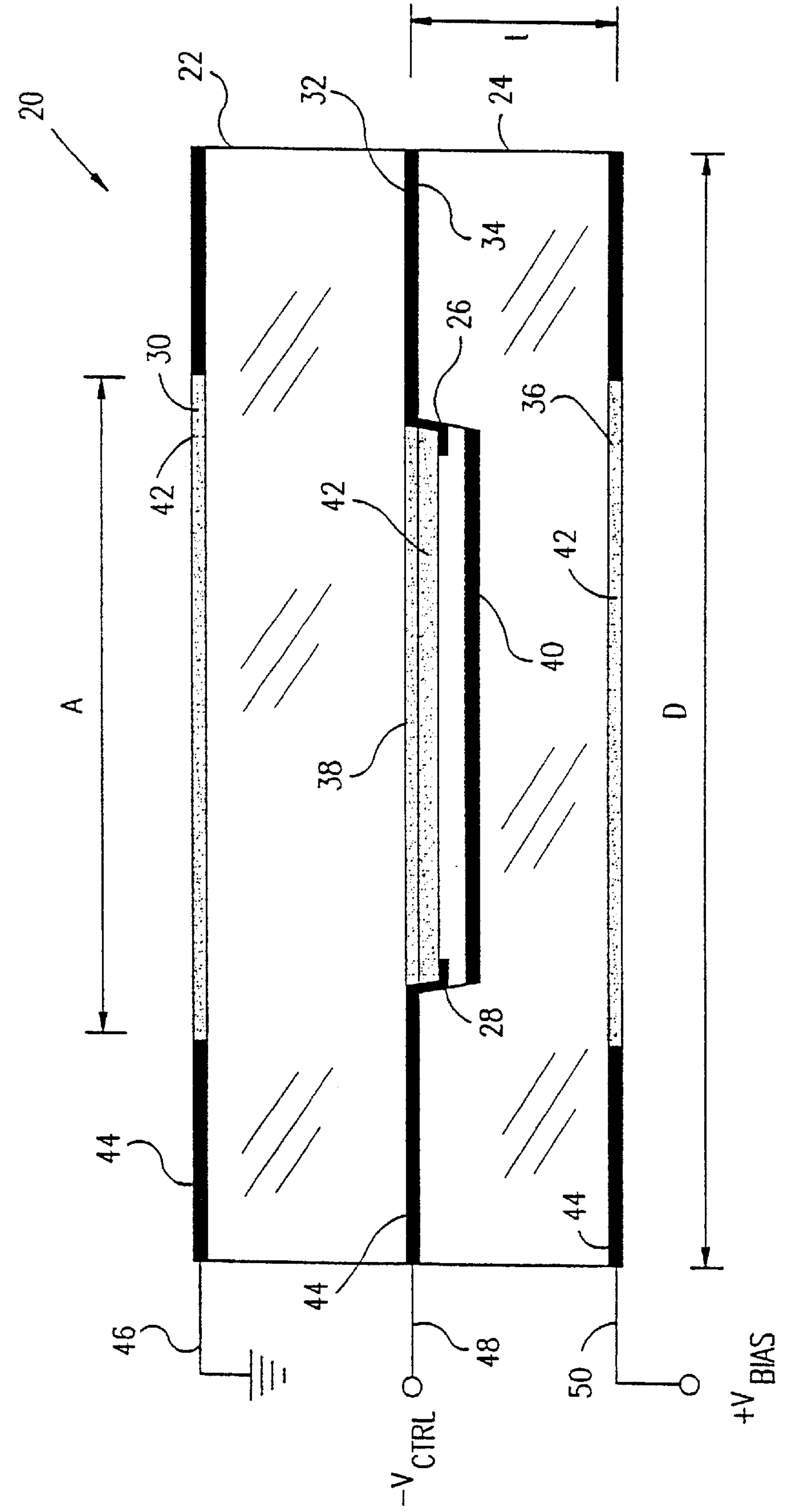
FIG. 1 is a schematic, sectional illustration of an optoelectronic shutter, in accordance with a preferred embodiment of the present invention.

Reference is now made to FIG. 1, which is a schematic, sectional illustration of an optoelectronic shutter 20, in accordance with a preferred embodiment of the present invention. Shutter 20 comprises an input plate 22 and an output plate 24. The output plate has a recess 26, which is preferably etched by photolithographic methods, known in the art, into an inner surface 34 of the plate. The unrecessed portion of surface 34 is bonded to an inner surface 32 of input plate 22, so as to form a vacuum-tight chamber 28 between the plates.

Each of plates 22 and 24 preferably comprises a flat circular plate of quartz, having a diameter D in the range of 10–50 mm and thickness t in the range 0.5–5 mm. Alternatively, one or both plates may comprise GaAs or silicon (when shutter 20 is to be used with infrared light), or other suitable glass or crystalline material that is transparent in a wavelength range of interest. Further alternatively, the plates may be square or rectangular, or have any other shape appropriate to the application in which shutter 20 is to be used. Preferably, the output plate comprises a fiber optic face plate.

Before the plates are bonded together, a photocathode layer 38 is deposited on inner surface 32 of input plate 22, and a photoluminescent anode layer 40 is deposited opposite the photocathode on inner surface 34 of output plate 24, facing into chamber 28. The dimensions of these layers define an active aperture A of shutter 20, which may preferably be as large as 40 mm. The aperture may be round, but may alternatively be square, rectangular or have another shape appropriate to the application.

Chamber 28 provides a vacuum gap between photocathode 38 and anode 40, which gap is preferably 250–500 $\mu$m wide, but may be as small as 50 $\mu$m or as large as 1 mm. Generally, when the aperture A is large, the gap is preferably relatively wide, so that mechanical distortion of plates 22 and 24, due to pressure differences, for example, causes only insignificant proportional variations in the width of the gap between the center and the edges of the aperture. For clarity of illustration, the dimensions of shutter 20 in FIG. 1, and particularly the width of chamber 28 and the thickness of layers 38, 40, 42 and 44 are not drawn to scale.

Photocathode layer 38 preferably comprises a layer of photoelectric material, for example, CdSe, as is known in the art, which is preferably deposited on surface 32 to a thickness of 10–50 $\mu$m. Alternatively, layer 38 may comprise a planar diode structure. If plate 22 is made of a semiconductor material, such as GaAs, for example, the planar diode may be produced by suitably doping the GaAs adjacent to surface 32, using methods known in the art. Anode layer 40 preferably comprises a layer of photoluminescent material, preferably ZnS or an electron-sensitive phosphor, as is known in the art. Layer 40 is preferably also 10–50 $\mu$thick. A transparent, conductive coating 42, preferably ITO, as is known in the art, is preferably deposited on outer surfaces 30 and 36 of plates 22 and 24, respectively, and on inner surface 32 of plate 22, preferably over photocathode layer 38. Preferably, coating 42 is deposited on at least a central portion of surfaces 30 and 36, corresponding generally to the area of the active aperture of shutter 20.

A metal coating 44, for example, gold, is preferably deposited on surfaces 30 and 36 peripheral to these central portions and on inner surface 32 of input plate 22, peripheral to photocathode 38. On each of surfaces 30, 36 and 32, the respective metal coating 44 overlaps at least an outer margin of coating 42 and is electrically coupled thereto. Electrical leads 46, 48 and 50, for activating shutter 20, as will be described below, are then fastened to metal coatings 44 on surfaces 30, 32 and 36, respectively.

After the above steps have been accomplished, plates 22 and 24 are bonded together as shown in FIG. 1. Bonding may be accomplished by means of indium sealing or by brazing or fusing plates 22 and 24 together, as is known in the art. The bonding operation is performed under vacuum conditions, preferably at $10^{-6}$ torr or better, so as to produce a required vacuum in chamber 28. Preferably, plates 22 and 24 are degassed under vacuum before being bonded. Further preferably, a getter, for example palladium, is placed in chamber 28 before bonding is completed. The entire shutter 20 is then potted, preferably in insulating plastic, as is known in the art, and packaged as required, preferably leaving the active aperture clear of obstruction.

To operate shutter 20, a positive voltage $V_{bias}$, preferably in the range 300–500 VDC, depending on the gap between photocathode 38 and anode 40, is applied to lead 50, while lead 46 is grounded. Photocathode 38 is thus held at a negative bias potential relative to anode 40. The potential is not high enough to accelerate photoelectrons across chamber 28, so that the shutter remains closed.

To open the shutter, a negative control voltage pulse, $-V_{ctrl}$, preferably in the range of 10–20 Volts, or alternatively, a higher voltage, is applied to lead 48, and thus to layer 42. The increased potential difference between photocathode 38 and anode 40 causes photoelectrons emitted by the photocathode to be accelerated across chamber 28 and to strike anode 40, which then emits photons in response thereto. Because of the close proximity of photocathode 38 and anode 40, the electrons emitted by the photocathode are "proximity focused" onto the anode and do not undergo significant lateral spreading. Thus, an optical image that is focused through input plate 22 onto photocathode 38 will be re-emitted by photoluminescent anode 40 and transmitted out through output plate 24, without significant image degradation beyond the "granularity" of the anode material.

Figure 2:
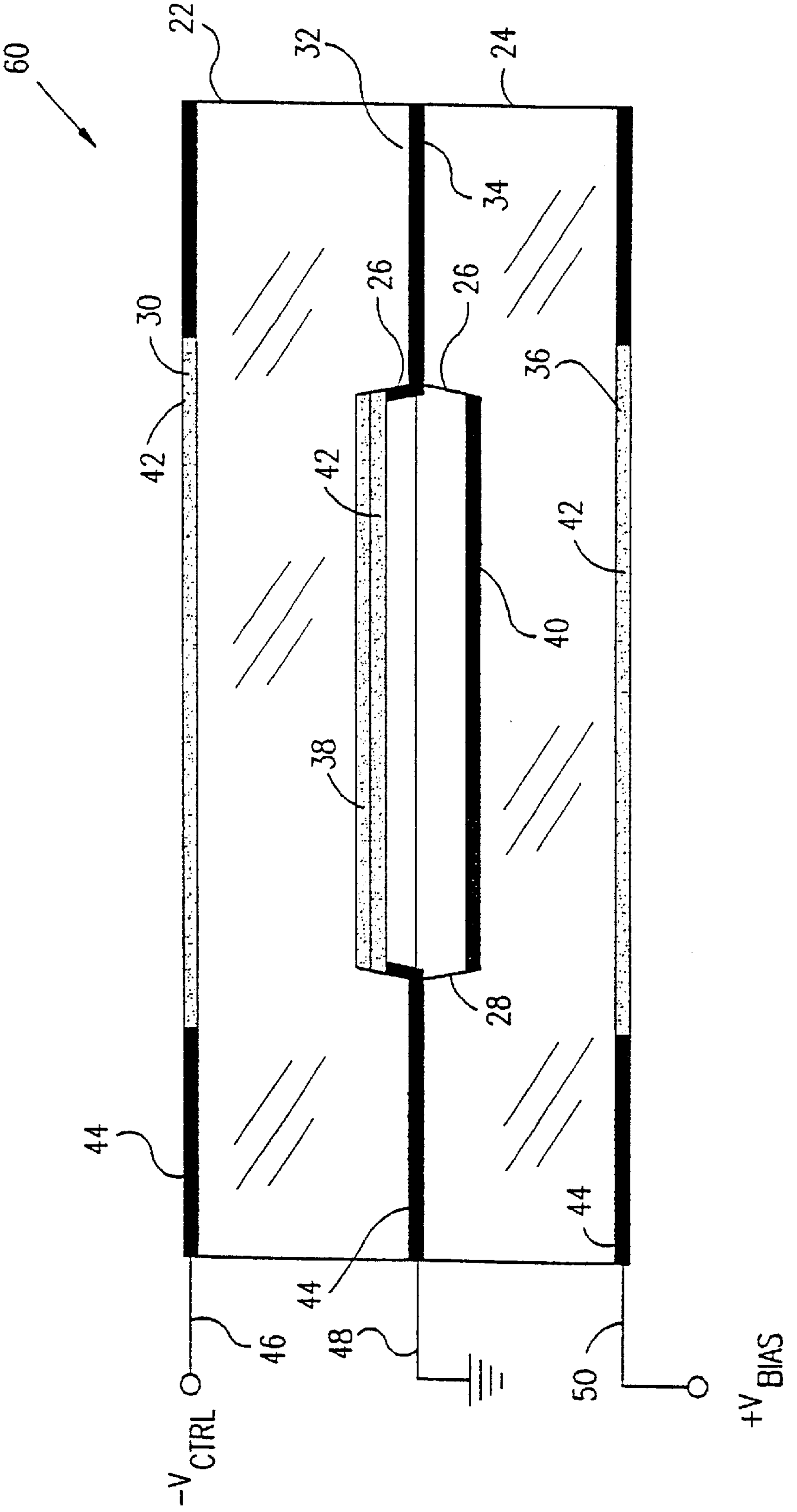
FIG. 2 is a schematic, sectional illustration of an optoelectronic shutter, in accordance with another preferred embodiment of the present invention.

FIG. 2 is a schematic, sectional illustration showing another shutter 60, in accordance with an alternative preferred embodiment of the present invention. The construction of shutter 60 is substantially similar to that of shutter 20, as described above with reference to FIG. 1, except that in shutter 60, both input plate 22 and output plate 24 have matching recesses 26, which together form chamber 28. A common substrate type may thus be used for both of plates 22 and 24.

Additionally, as shown in FIG. 2, lead 48 (and thus layer 42) of shutter 60 is grounded, while lead 46 receives negative voltage control pulses at $-V_{ctrl}$. In other respects, however, the operation of shutter 60 is substantially similar to that of shutter 20. Other, alternative configurations of the electrical leads of such shutters will be apparent to those skilled in the art.

In the preferred embodiments shown in FIGS. 1 and 2 and described above, by applying conductive coatings 42 to outer surfaces 30 and 36 of plates 22 and 24, the high-voltage and ground contacts of shutter 20 are kept relatively far apart. Alternatively, however, conductive coatings may instead be applied to inner surfaces 32 and/or 34 of plates 22 and 24, either over or below photocathode layer 38 and anode layer 40, preferably with the addition of suitable insulating layers to separate the conductive layers.

Figure 3A:
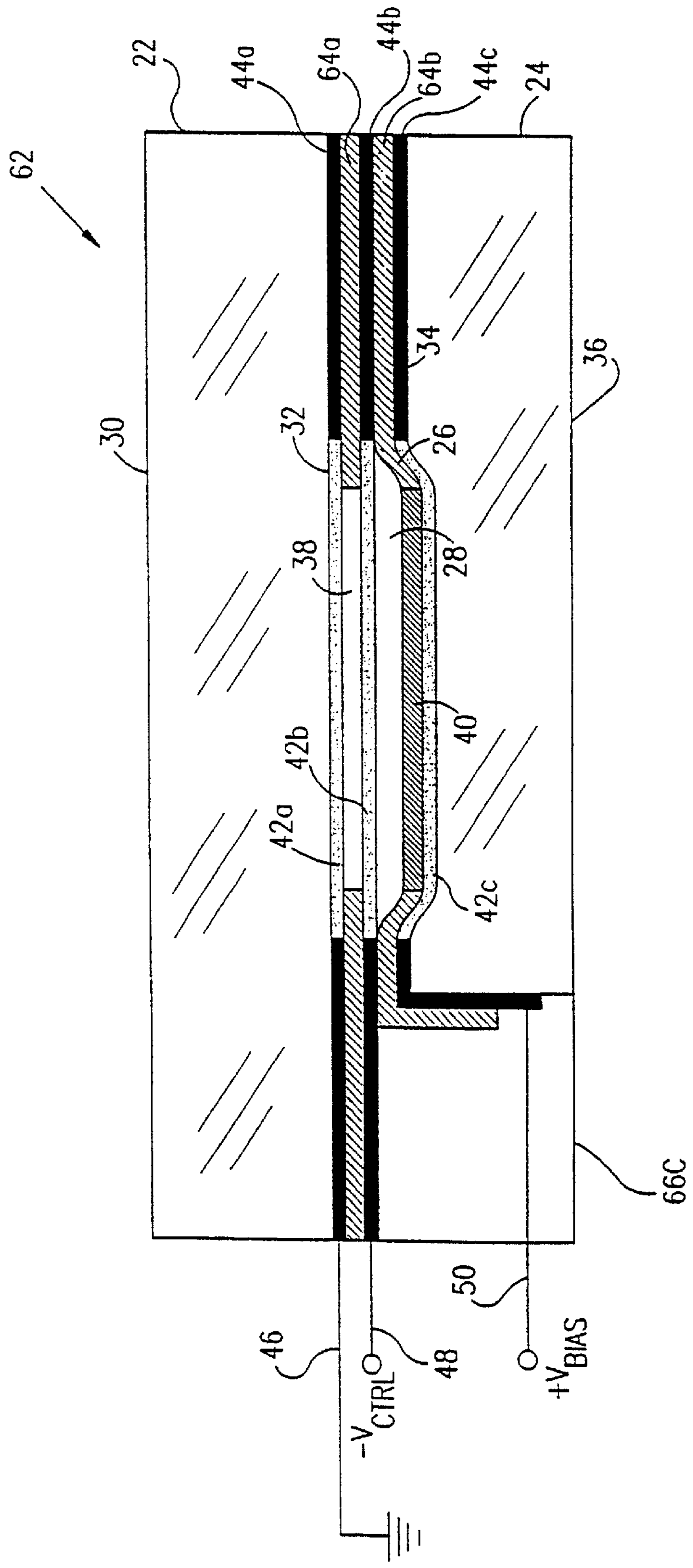
FIG. 3A is a schematic, sectional illustration of an optoelectronic shutter, in accordance with still another preferred embodiment of the present invention.

FIG. 3A is a schematic, sectional illustration of a shutter 62 of this type, in accordance with a preferred embodiment of the present invention. The central portion of inner surface 32 of input plate 22 is coated first with a transparent, conducting layer 42*a*, preferably ITO, then with photocathode 38, and finally with another transparent, conducting layer 42*b*. Metal coatings 44*a* and 44*b*, preferably gold coatings, are deposited peripherally to and in electrical contact, preferably overlapping, with layers 42*a* and 42*b*, respectively. An electrically insulating layer 64*a*, for example, $SiO_2$, is deposited generally peripherally to photocathode 38, so as to prevent electrical contact between conductive layers 44*a* and 44*b*.

On inner surface 34 of output plate 24, a transparent, conducting layer 42*c* is deposited generally within recess 26, with a peripheral metal coating 44*c* electrically in contact therewith. Photoluminescent anode 40 is then deposited over layer 42*c*. An insulating layer 64*b* is deposited over conducting layer 42*c* peripheral to recess 26, so as to prevent electrical contact between conducting layers 42*b* and 42*c* when plates 22 and 24 are bonded together. Layers 44*c* and 64*b* continue over the edge of plate 24 into a peripheral notch 66*c* therein, to facilitate fastening electrical lead 50 thereto, as described below.

Figure 3B:
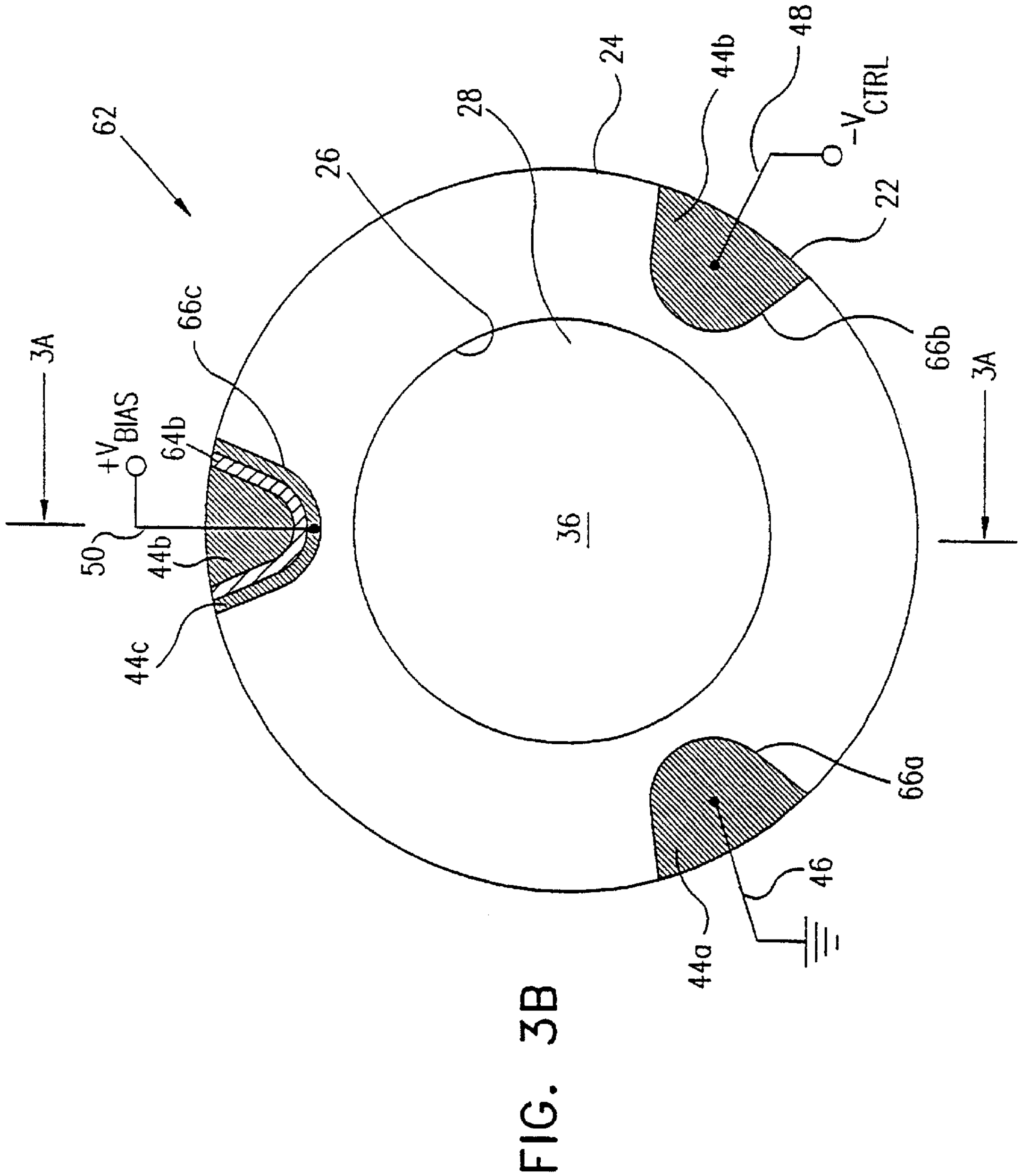
FIG. 3B is a schematic illustration showing a bottom view of the shutter of FIG. 3A.

FIG. 3B is a schematic illustration showing shutter 62 in a bottom view (from the perspective of FIG. 3A), i.e., looking along the optical axis of the shutter toward outer surface 36. Output plate 24 is cut away to form three peripheral notches 66*a,* 66*b* and 66*c* therein. Within notch 66*c,* metal layer 44*c* is exposed, and lead 50 is attached thereto, to supply the bias voltage $+V_{bias}$ to conducting layer 42*c* adjacent anode 40. Within notch 66*b,* layer 44*c* and insulating layer 64*b* are absent, preferably on account of masking the area of notch 66*b* during the deposition of these layers. As a result, layer 44*b* is exposed within notch 66*b,* and lead 48 is attached thereto, supplying the control voltage $-V_{ctrl}$ to conducting layer 42*b* between cathode 38 and anode 40. Similarly, within notch 66*c,* both of metal layers 44*b* and 44*c* and both of insulating layers 64*a* and 64*b* are absent, so that layer 44*a* is exposed, and lead 46 is bonded thereto. Lead 46 is grounded, so as to ground conducting layer 42*a,* on the opposite side of photocathode 38 from conducting layer 42*b*.

Operation of shutter 62 is substantially similar to the operation of shutter 20, described above with reference to FIG. 1. In the configuration of shutter 62, however, a substantially lower biasing voltage $V_{bias}$ may generally be used to create the desired potential difference across chamber 28.

It will be appreciated that shutters of various configurations may be constructed, in accordance with the principles of the present invention, in which the input and output plates are shaped and/or configured differently from those shown in FIGS. 1, 2 and 3A and 3B. For example, although plates 22 and 24 are shown as having substantially similar external dimensions, in other preferred embodiments of the present invention, one of the plates may have a larger diameter and/or thickness than the other. Additionally or alternatively, the two plates may be made of different materials. In any case, such shutters will retain at least some of the advantages of the present invention, which include simplicity and low cost of manufacture, compactness, and high ratio of aperture to thickness.

In some preferred embodiments of the present invention, photocathode 38 is sensitive to a radiation wavelength range other than visible radiation, for example, infrared or ultraviolet radiation. In these embodiments, shutter 20 or shutter 60 may be used to up- or down-convert the radiation frequency to the visible range. Conversion to other radiation output ranges is also possible.

Figure 4:
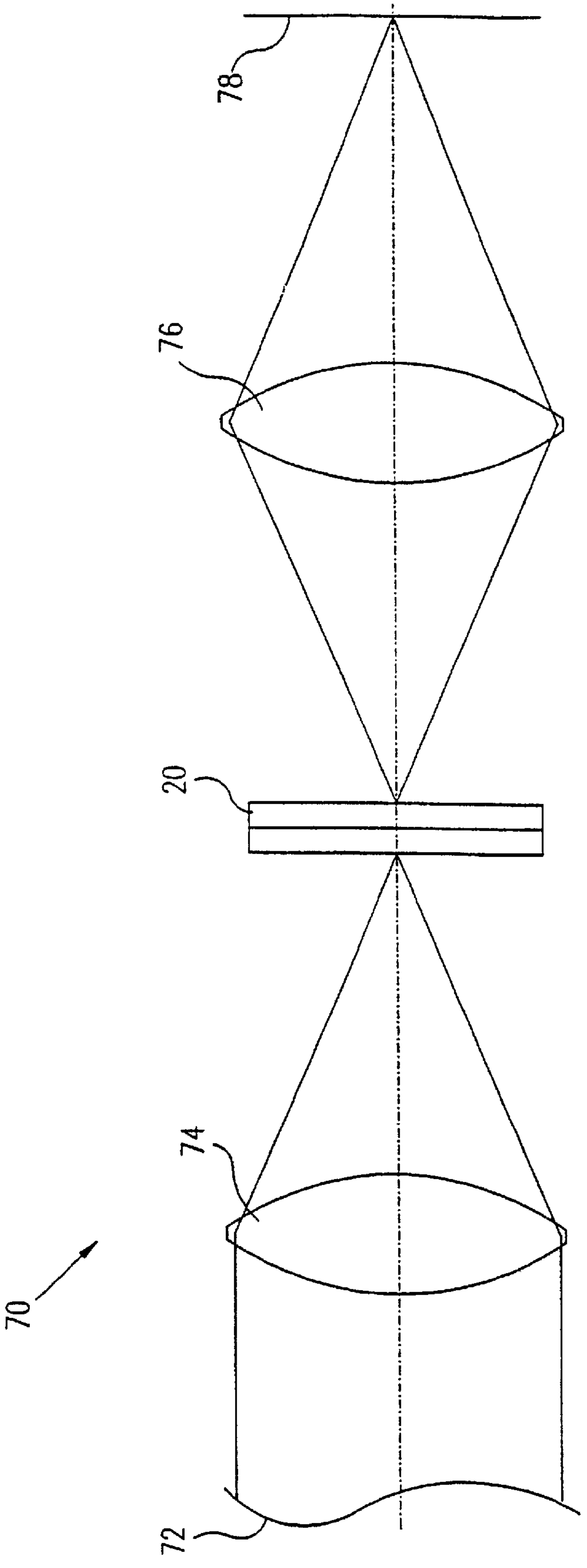
FIG. 4 is a schematic illustration of an electronic imaging camera, including the shutter of FIG. 1, in accordance with a preferred embodiment of the present invention.

FIG. 4 is a schematic illustration showing the use of shutter 20 in an electronic imaging camera 70. An objective lens 74 forms an image of a scene 72 on shutter 20, preferably focused at the plane of photocathode 38. When the shutter is opened, as described above, a corresponding image of scene 72 is formed on anode 40. This corresponding image is focused by an imaging lens 76 onto a detector array 78, for example, a CCD array.

Shutter 20 in camera 70 may be used for a variety of purposes. For example, the shutter may be opened and closed rapidly so as to capture images of transient events or moving objects in scene 72. Alternatively, as described in the above-mentioned PCT patent applications, shutter 20 may be used in conjunction with a suitably pulsed light source so that camera 70 captures images of objects and features in scene 72 only within a certain, predetermined range of distances from the camera.

While the most preferred embodiment of the invention includes the formation of the vacuum chamber by etching one or both of the input or output plates, some aspects of the invention include a construction in which a thin glass or other ring of suitable material is used to separate planar input and output plates, such that a suitable vacuum chamber is formed between them. Electrodes and other layers as described in the above preferred embodiments of the invention are then formed on the flat input an output plates.

It will be appreciated that the preferred embodiments described above are cited by way of example, and the full scope of the invention is limited only by the claims.

What is claimed is:

1. An optoelectronic shutter, comprising:

an input plate and an output plate, comprising material substantially transparent to input and output radiation respectively, each plate having an outer and an inner surface, wherein a recess is formed in the inner surface of at least one of the plates, and wherein respective non-recessed portions of the inner surfaces of the plates are bonded together, and the recess defines a vacuum chamber enclosed by the two plates;

a photocathode, fixed to the inner surface of the input plate, adjacent the chamber;

a photoluminescent anode, fixed to the inner surface of the output plate, adjacent the chamber and opposite the photocathode; and means for providing a potential difference between the photocathode and the anode.

2. A shutter according to claim 1, wherein the recess is formed using Micro-Electromechanical System technology.

3. A shutter according to claim 1, wherein substantially similar recesses are formed in the inner surfaces of both the plates.

4. A shutter according to claim 1, wherein electrons emitted by the photocathode pass through the chamber and strike the anode, respective to a trigger pulse applied to the shutter.

5. A shutter according to claim 4, wherein the electrons pass through the chamber substantially without defocusing.

6. A shutter according to claim 4, wherein there are no external electromagnetic fields applied to the shutter for the purposes of electron focusing.

7. A shutter according to claim 4, wherein the shutter does not include a microchannel plate.

8. An optoelectronic shutter for radiation, comprising:

an input plate and an output plate, of material substantially transparent to the radiation, each plate having an outer and an inner surface, the plates defining and enclosing a vacuum chamber therebetween;

a photocathode, fixed to the inner surface of the input plate, adjacent the chamber;

a photoluminescent anode, fixed to the inner surface of the output plate, adjacent the chamber and opposite the photocathode; and means for providing a potential difference between the photocathode and the anode;

wherein electrons emitted by the photocathode pass through the chamber and strike the anode, responsive to a trigger pulse applied to the shutter, the distance between the photocathode and the anode being such that the electrons strike the anode substantially without defocusing, wherein there are no electromagnetic fields, other than those providing said potential difference between the photocathode and the anode, applied to the shutter for the purpose of electron focusing, and wherein the shutter does not include a microchannel plate.

9. A shutter according to claim 8, wherein other than fields due to the trigger pulse and to the potential difference applied between the photocathode and the anode, there are no electromagnetic fields applied to the shutter.

10. A shutter according to claim 8, wherein the trigger pulse has a peak voltage substantially less than 50 volts.

11. A shutter according to claim 10, wherein the peak voltage is less than or equal to 20 volts.

12. A shutter according to claim 11, wherein the peak voltage is substantially in the range 10–20 volts.

13. A shutter according to claim 1, wherein at least one of the plates comprises quartz.

14. A shutter according to claim 1, wherein at least one of the plates comprises glass.

15. A shutter according to claim 1, wherein at least one of the plates comprises a semiconductor material.

16. A shutter according to claim 1, wherein the photocathode comprises CdSe.

17. A shutter according to claim 1, wherein the photocathode comprises a planar diode.

18. A shutter according to claim 1, wherein the anode comprises ZnS.

19. A shutter according to claim 1, wherein the anode comprises an electron sensitive phosphor.

20. A shutter according to claim 1, wherein the means for providing a potential difference comprises a transparent, conductive coating on the outer surfaces of both plates and on the inner surface of one of the plates.

21. A shutter according to claim 20, wherein the means for providing a potential difference further comprises a metal coating on at least a portion of each of the outer surfaces of both plates and over the inner surface of the one of the plates having the transparent, conductive coating, wherein the metal coating is situated along the periphery of and electrically coupled to the transparent, conductive coating thereon.

22. A shutter according to claim 20, wherein the means for providing a potential difference comprises electrical leads electrically coupled to the conductive coatings on the outer surfaces of both plates and on the inner surface of the one of the plates.

23. A shutter according to claim 1, wherein the means for providing a potential difference comprises:

a first transparent, conductive coating on the inner surface of the input plate, between the plate and the photocathode;

a second transparent, conductive coating on the inner surface of the output plate, between the plate and the anode; and a third transparent, conductive coating on the inner surface of the one of the input and output plates, intermediate the photocathode and the anode.

24. A shutter according to claim 23, wherein the means for providing comprises first, second and third metal coatings on portions of the inner surfaces of the input and output plates, wherein the metal coatings are situated along the periphery of and electrically coupled to the first, second and third transparent conductive coatings, respectively.

25. A shutter according to claim 24, and comprising an electrically insulating layer intermediate two of the metal coatings.

26. A shutter according claim 22, wherein the means for providing a potential difference comprises electrical leads coupled to the transparent, conductive coatings.

27. A shutter according to claim 22, wherein one of the input and output plates has a notch formed therein, the notch providing access to at least one of the coatings on the inner surface of one of the plates, and wherein one of the electrical leads is fastened to the coating exposed within the notch.

28. A shutter according claim 1, wherein the anode is electrically negatively biased by said potential difference relative to the photocathode.

29. A shutter according to claim 28, wherein the anode is biased relative to the photocathode by a biasing voltage substantially less than 1000 VDC.

30. A shutter according to claim 29, wherein the biasing voltage is less than or equal to 500 VDC.

31. A shutter according to claim 30, wherein the biasing voltage is substantially in the range 300–500 VDC.

32. A shutter according to claim 1, wherein the overall thickness of the shutter, measured between the outer surfaces of the input and output plates, is substantially less than 20 mm.

33. A shutter according to claim 32, wherein the overall thickness of the shutter is less than or equal to 10 mm.

34. A shutter according to claim 33, wherein the overall thickness is substantially in the range 1–10 mm.

35. A shutter according to claim 1, wherein the shape of the shutter, as defined by the shape of a clear aperture thereof, is substantially rectangular.

36. A shutter according to claim 1, and comprising a getter inside the chamber.

37. A shutter according to claim 1, wherein the output plate comprises a fiber optic face plate.

38. A shutter according to claim 1, wherein the output plate is comprised of a non-conducting material.

39. A shutter according to claim 1, wherein the input plate is comprised of a non-conducting material.

40. A method for producing an optoelectronic shutter for radiation, comprising:

providing first and second plates of material substantially transparent to the radiation, each plate having a first and a second surface;

etching a recess in the first surface of at least one of the plates;

depositing photocathode material on the first surface of the first plate;

depositing photoluminescent anode material on the first surface of the second plate;

providing means for impressing an electric field between the photocathode and the anode; and bonding the first surface of the first plate to the first surface of the second plate to form an evacuated chamber between the plates, which chamber comprises the recess;

wherein depending the photocathode and anode materials comprises depositing the materials over portions of the respective first surfaces of the plates that adjoin the chamber.

41. A method according to claim 40, wherein etching the recess in the first surface of at least one of the plates comprises etching recesses in the first surfaces of both of the plates.

42. A method according to claim 40, wherein depositing photocathode material comprises doping an outer layer on the first plate to produce a planar diode.

43. A method according to claim 40, wherein providing means for impressing a potential difference includes depositing a transparent, conductive coating on the second surfaces of both plates and on the first surface of one of the plates.

44. A method according to claim 43, wherein providing means for impressing a potential difference comprises depositing a metal coating on the surfaces on which the transparent, conductive coating has been deposited, wherein the metal coating is deposited along the periphery of and in electrical contact with the transparent, conductive coating.

45. A method according to claim 44, and wherein providing means for impressing a potential difference comprises fixing an electrical contact to the metal coating.

46. A method according to claim 45, and comprising forming a notch in an edge of one of the first and second plates to provide access to the metal coating, wherein fixing the electrical contact to the metal coating comprises fixing the contact within the notch.

47. A method according to claim 40, and comprising potting the shutter.

48. A shutter according to the method of claim 40.

* * * * *